United States Patent
Ishihara et al.

(10) Patent No.: US 6,898,001 B2
(45) Date of Patent: May 24, 2005

(54) NOISE FIGURE-MEASURING DEVICE AND NOISE FIGURE-MEASURING METHOD

(75) Inventors: Gentaro Ishihara, Tokyo (JP); Tohru Mori, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 159 days.

(21) Appl. No.: 09/996,509

(22) Filed: Nov. 28, 2001

(65) Prior Publication Data

US 2002/0089665 A1 Jul. 11, 2002

(30) Foreign Application Priority Data

Nov. 28, 2000 (JP) .................................... P. 2000-361527

(51) Int. Cl.[7] .............................................. H01S 3/00
(52) U.S. Cl. .................................................... 359/337
(58) Field of Search .......................... 359/337.12, 337, 359/337.1

(56) References Cited

U.S. PATENT DOCUMENTS

| | | | | |
|---|---|---|---|---|
| 5,340,979 | A | * | 8/1994 | Baney et al. ............ 250/214 B |
| 5,521,751 | A | * | 5/1996 | Aida et al. ................... 359/337 |
| 5,677,781 | A | * | 10/1997 | Mori et al. .................... 398/26 |
| 5,696,707 | A | * | 12/1997 | Hentschel et al. ............. 702/69 |
| 5,781,322 | A | * | 7/1998 | Uchiyama et al. ........... 359/161 |
| 5,861,980 | A | * | 1/1999 | Ono ....................... 359/337.12 |
| 5,917,649 | A | * | 6/1999 | Mori et al. ............. 359/341.31 |
| 6,016,213 | A | * | 1/2000 | Farber et al. ................. 359/177 |
| 6,226,117 | B1 | * | 5/2001 | Hentschel ................... 359/337 |
| 6,236,452 | B1 | * | 5/2001 | Goto et al. ................. 356/73.1 |
| 6,480,318 | B2 | * | 11/2002 | Mori et al. .................. 359/264 |
| 6,542,233 | B1 | * | 4/2003 | Bray et al. ................... 356/324 |
| 6,570,703 | B2 | * | 5/2003 | Murakami et al. ..... 359/341.42 |
| 2001/0046082 | A1 | * | 11/2001 | Mori et al. .................. 359/333 |
| 2002/0163683 | A1 | * | 11/2002 | Antoniades et al. ........ 359/110 |
| 2002/0186454 | A1 | * | 12/2002 | Sakurai ...................... 359/333 |
| 2003/0042402 | A1 | * | 3/2003 | Boertjes et al. .......... 250/214.1 |

FOREIGN PATENT DOCUMENTS

| | | | |
|---|---|---|---|
| EP | 0 594 178 A1 | 4/1994 | .......... H04B/10/16 |
| EP | 0 887 954 A2 | 12/1998 | .......... H04B/10/16 |
| EP | 1 148 664 A2 | 10/2001 | .......... H04B/10/08 |
| GB | 2 310 096 | 8/1997 | .......... H04B/10/08 |
| JP | Hei 5-133841 | 5/1993 | .......... G01M/11/00 |
| JP | 07005070 A | * 1/1995 | .......... G01M/11/00 |

OTHER PUBLICATIONS

Agrawal, Govind P. Fiber–Optic Communication Systems. 2nd Edition. John Wiley & Sons, Inc. 1997. pp. 361–367.*
Lerkvarnyu et al. Moving Average Method for Time Series Lidar Data. http://www.gisdevelopment.net/aars/acrs/1998/ps3/ps3016pf. 1998.*

* cited by examiner

Primary Examiner—Thomas H. Tarcza
Assistant Examiner—Deandra M. Hughes
(74) Attorney, Agent, or Firm—Fish & Richardson P.C.

(57) ABSTRACT

Output light spectrum $P2(\lambda)$ data from an optical amplifier and input light spectrum $P1(\lambda)$ data of signal light are prepared, the difference between the $P2(\lambda)$ and a value obtained by multiplying the $P1(\lambda)$ by a provisional gain GT is determined (Steps S232), for the obtained spectrum data, a noise removing process such as a moving average process and the like is performed and then, a spline interpolation process is also performed, whereby ASE light spectrum $P3(\lambda)$ data is prepared and an ASE light level P ASE is determined (Steps S233 through S235). In addition, a noise figure-measuring device 10 calculates the number of channels of WDM light and signal light wavelengths of the respective channels based on the $P1(\lambda)$ or $P2(\lambda)$, and performs analysis to calculate a noise figure NF and the like of an appointed wavelength range around the center of each wavelength thus calculated.

12 Claims, 7 Drawing Sheets

NOISE FIGURE-MEASURING DEVICE AND NOISE FIGURE-MEASURING METHOD

BACKGROUND OF THE INVENTION

1. Field of the Invention

The present invention relates to a noise figure-measuring device and a noise figure-measuring method.

2. Description of the Related Art

In recent years, an optical amplifier has been promoted to improve the quality of transmission information in an optical communications system. The signal to noise ratio of transmission information according to the optical communications system using an optical amplifier is strongly influenced by noise characteristics of the optical amplifier. Therefore, when constructing an optical communications system using an optical amplifier, it is necessary to accurately grasp a noise figure NF, which is a basic characteristic of an optical amplifier. For that purpose, the level of amplified spontaneous emission (ASE) light contained output light from the optical amplifier must be accurately measured. The optical amplifier outputs input light after amplification thereof. A noise component contained in the output light from the optical amplifier is ASE light. In the conventional art, during measurements of an ASE light level, a fitting of a higher-degree function such as a normal distribution curve, a Lorenz curve or the like is performed with respect to a wavelength region excluding an output signal light component of an optical amplifier and the level for a signal light wavelength of an obtained approximation curve is specified as an ASE light level.

Herein, referring to FIG. 7, a method for measuring an ASE light level in the conventional art will be described.

FIG. 7 is a flowchart for explaining an ASE light level measurement in the conventional art.

Input signal light having a signal wavelength $\lambda_S$ is amplified by an optical amplifier, the amplified input signal light is outputted to an appointed optical spectrum analyzer. The appointed optical spectrum analyzer generates output light spectrum $P2(\lambda)$ data from the optical amplifier. Of the output light spectrum $P2(\lambda)$ data thus obtained, output light spectrum $P2(\lambda)$ data within a wavelength range of $\lambda_S \pm \Delta\lambda_{MA}$, that is, a wavelength mask range of $\pm\Delta\lambda_{MA}$ (which has been set by a user in advance) around the center of the signal wavelength $\lambda_S$ is masked (removed) (Step S71).

After the above-described mask process, a curve-fit process using an appointed fitting function is performed for the output light spectrum $P2(\lambda)$ data that has not been masked. A spectrum within the above-described masked wavelength range of $\lambda_S \pm \Delta\lambda_{MA}$ is interpolated, and then an ASE light spectrum $P3(\lambda)$ is specified (Step S72).

The above-described fitting function is a high-degree function such as a normal distribution curve, a Lorenz curve or the like and has been selected by the user in advance.

An ASE light level P ASE on the signal wavelength $\lambda_S$ is determined based on the ASE light spectrum $P3(\lambda_S)$ (Step S73).

However, in the aforementioned conventional method, there have been the following problems. A measurement of the noise figure NF of the optical amplifier is performed based on the ASE light level. Accordingly, an accurate measurement of the ASE light level is strongly requested. In addition, a light signal to be inputted in the optical amplifier is a laser beam owing to a light source such as a DFB-LD, etc. and in terms of this light source spectrum, in addition to a signal light wavelength component, a source spontaneous emission light (SSE) component is contained in a noise component thereof. Therefore, in noise components output from the optical amplifier in addition to ASE light, an amplified SSE light component is also contained.

As shown in FIG. 8A, the source spontaneous emission light component SSE is contained in input light spectrum $P1(\lambda)$ data. Therefore, an amplified source spontaneous emission light component SSE is also contained in output light spectrum $P2(\lambda)$ data. Namely, in the output light spectrum $P2(\lambda)$ data, , the amplified SSE light is contained in addition to the amplified signal light and ASE light.

Therefore, when measuring the ASE light level based on the output light spectrum of the optical amplifier, a composite light level between the ASE light and amplified SSE light has been, in reality, measured. Namely, an error in measurement of the ASE light level P ASE caused by the SSE light has been great and it has been difficult to accurately measure the ASE light level P ASE.

In addition, as a fitting function for assuming the ASE light level, the high-degree function such as a normal distribution curve, a Lorenz curve or the like is used. As shown in FIG. 8B, the ASE light level P ASE has been specified based on the ASE light spectrum $P3(\lambda)$ data obtained by interpolating an appointed fitting function into the wavelength range of the wavelength mask range of $\pm\Delta\lambda_{MA}$ around the center of the signal wavelength $\lambda_S$.

However, according to this method, an obtainable fitting function does not suit the original spectrum curve $P2(\lambda)$. As a result, an approximation error in the optical spectrum due to the fitting function becomes large. It becomes difficult to accurately specify the ASE light spectrum $P3(\lambda)$. Accordingly, it has been a difficult problem to accurately specify the ASE light level P ASE based on the specified ASE light spectrum $P3(\lambda)$.

Furthermore, when signal light supplied to the optical amplifier is wavelength division multiplex (WDM) light in that a plurality of wavelengths (channels) is multiplexed, a noise figure NF for each channel is individually measured. Therefore certain levels of time and labor have been necessary for measurement.

SUMMARY OF THE INVENTION

It is an object of the invention to provide a noise figure-measuring device and a noise figure-measuring method whereby an ASE light level output from the optical amplifier can be accurately and easily measured.

In order to solve such an object, the present invention is provided with the following characteristics. In the following description concerning means, constructions corresponding to an embodiment will be indicated in parentheses as examples. Symbols and the like are those for referring to the drawings, which will be described later.

According to the invention, there is provided a noise figure-measuring device (for example, a noise figure-measuring device 10 shown in FIG. 1) comprising:

an optical spectrum analyzing section (for example, an optical spectrum analyzer 13 shown in FIG. 1) for preparing optical spectrum information of appointed signal light and a noise figure calculating section (for example, a data processing portion 14 shown in FIG. 1) for calculating a noise figure accompanying an optical amplifying section (for example, an optical amplifier 12 shown in FIG. 1) for amplifying signal light from an appointed light source at an appointed gain ratio based on the optical spectrum information prepared by the optical spectrum analyzing section, wherein the optical spectrum analyzing section prepares both optical spectrum information of signal light from a light source and optical spectrum information of signal light that has been amplified by the optical amplifying section.

Accordingly, when measuring the noise figure accompanying the optical amplifying section, measurement based on not only the optical spectrum information of signal light that has been amplified by the optical amplifying section but also the optical spectrum information of signal light from the light source becomes possible. Accordingly, measurement accuracy of the noise figure is improved.

According to the invention, the noise figure calculating section subtracts optical spectrum information of signal light from the light source that has been amplified to an appointed size from optical spectrum information of signal light that has been amplified by the optical amplifying section.

Accordingly, it becomes possible to remove noise components due to source spontaneous emission light, that both of the above-described two types of optical spectrum information contains, from the optical spectrum information of the above-described amplified signal light, thus providing a noise figure-measuring device in which measurement accuracy of the noise figure accompanying the light amplifier is further improved.

According to the invention, with respect to optical spectrum information which has been prepared by subtracting optical spectrum information of signal light from the light source, that has been amplified to an appointed size, from optical spectrum information of signal light that has been amplified by the optical amplifying section or spectrum information of signal light that has been amplified by the optical amplifying section, the noise figure calculating section removes or masks spectrum information of an appointed wavelength region of such optical spectrum information and also performs a spline interpolation process using a spline curve for the wavelength region.

Accordingly, it becomes possible to perform an interpolation process more accurately compared to the case using a high-degree function such as a normal distribution curve, a Lorenz curve or the like, thus an accurate noise figure-measuring device can be improved.

According to the invention, with respect to optical spectrum information which has been prepared by subtracting optical spectrum information of signal light from the light source, that has been amplified to an appointed size, from optical spectrum information of signal light that has been amplified by the optical amplifying section or spectrum information of signal light that has been amplified by the optical amplifying section, when the noise figure calculating section performs a spline interpolation process using a spline curve for an appointed wavelength region of such optical spectrum information, the interpolation process is performed by means of data of an arbitrary number of points from one point to all points in the wavelength region.

Accordingly, a noise figure-measuring device having high functionality, that can perform a preferable interpolation process independent of the number of points to be employed as data, can be provided.

According to the invention, the noise figure calculating section performs a noise removing process by a moving average process, etc., for optical spectrum information which has been prepared by subtracting optical spectrum information of signal light from the light source, that has been amplified to an appointed size, from optical spectrum information of signal light that has been amplified by the optical amplifying section or spectrum information of signal light that has been amplified by the optical amplifying section.

Accordingly, it becomes possible to remove noise that has been inducted by the spectrum analyzing means, thus a further accurate noise figure-measuring device can be realized.

According to the invention, if the optical spectrum information has been prepared from composite light of a plurality of signal lights, the noise figure calculating section detects the number of composing signal lights and wavelengths and also calculates, with respect to each signal light detected, a noise figure accompanying the optical amplifier.

Accordingly, based on the optical spectrum of each signal light, without performing an analyzing process relating to a measurement of the noise figure one by one, such processes can be performed in a lump, thus a noise figure-measuring device which is improved in operability and functionality can be realized.

DETAILED DESCRIPTION OF THE PRESENT INVENTION

Hereinafter, a noise figure-measuring device 10 according to an embodiment of the present invention will be described in detail with reference to FIG. 1 through FIG. 6.

Figure 1:
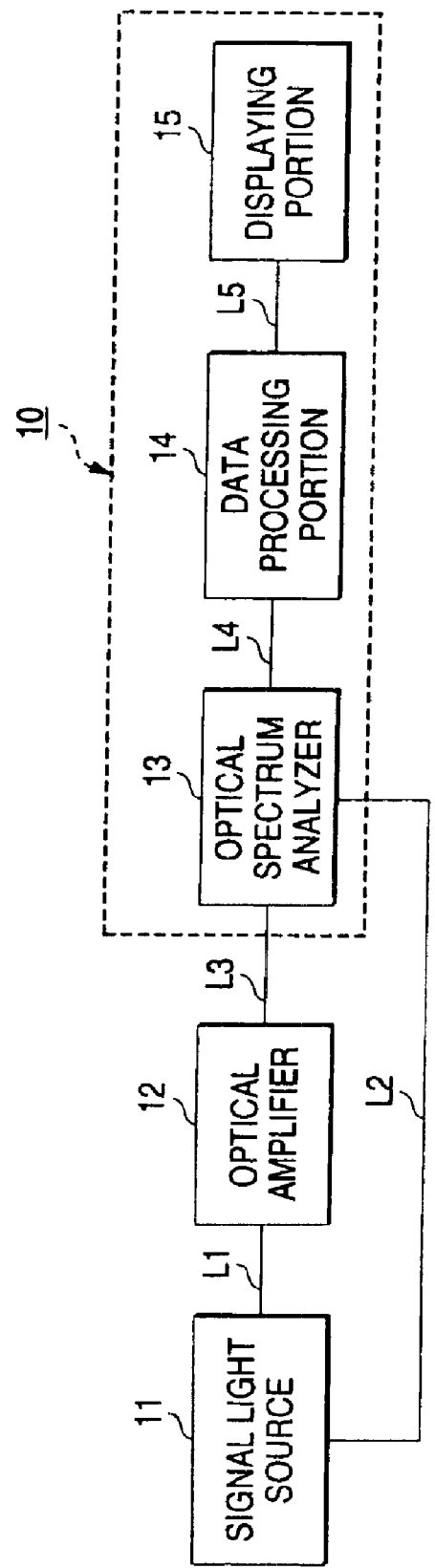
FIG. 1 is a block diagram for explaining the internal configuration of the noise figure-measuring device 10 according to an embodiment of the present invention.

FIG. 1 is a block diagram for explaining the internal configuration of the noise figure-measuring device 10 according to an embodiment of the present invention.

As shown in FIG. 1, the noise figure-measuring device 10 comprises an optical spectrum analyzer 13, a data processing portion 14, and a display portion 15, and a signal light source 11 and an optical amplifier 12, and all 11 to 15 are connected with the noise figure-measuring device 10. The portions from the signal light source 11 to the display portion 15 are linearly disposed in order via signal lines (optical fibers) L1 through L3 and electrical signal lines L4 and L5. Moreover, a signal line (optical fiber) L2, which directly connects the signal light source 11 with the optical spectrum analyzer 13, is provided.

The signal light source 11 outputs laser light owing to a light source such as a DFB-LD or the like and supplies the laser light as signal light to the optical amplifier 12 via the signal line (optical fiber) L1.

The optical amplifier 12 amplifies signal light supplied from the signal light source 11 based on an appointed amplification figure and outputs the amplified signal light to the optical spectrum analyzer 13 via the signal line (optical fiber) L3.

The optical spectrum analyzer 13 analyzes the optical spectrum of the signal light supplied via the signal line (optical fiber) L3 and prepares optical spectrum data thereof.

The data processing portion 14 analyzes and processes, by an appointed method, optical spectrum data prepared in the optical spectrum analyzer 13, calculates signal light wavelength $\lambda_S$, a peak value and the like, and outputs results of such various processes to the display portion 15 via the electrical signal line L5.

The display portion 15 comprises display screens such as a cathode ray tube (CRT), a liquid crystal display (LCD) and the like and displays various types of display information supplied from the data processing portion 14 on these display screens.

Now, operations of the noise figure-measuring device 10 according to the present embodiment will be described.

Figure 2:
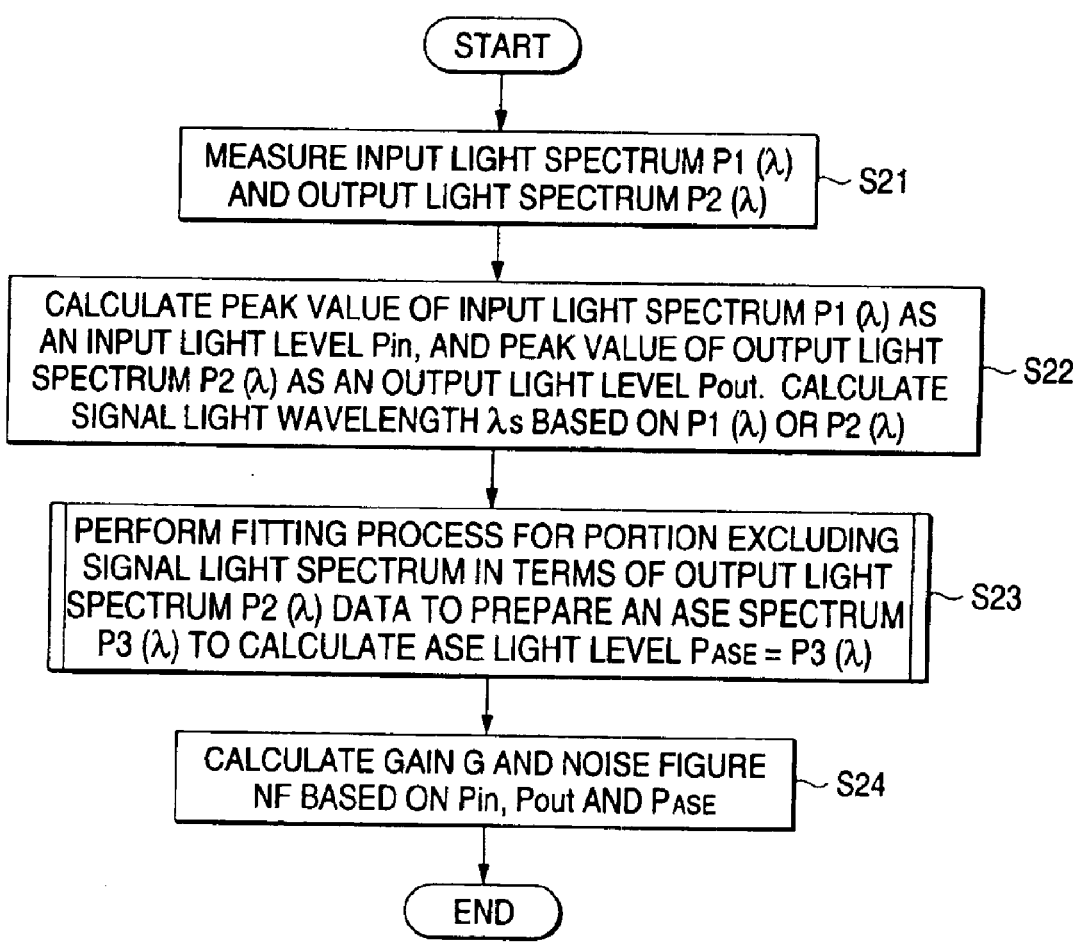
FIG. 2 is a flowchart for explaining processes for measuring the gain and noise figure NF by the optical amplifier 12 when the signal light is a single channel signal light in the noise figure-measuring device 10 according to an embodiment of the present invention.

FIG. 2 is a flowchart for explaining processes for measuring the gain of the optical amplifier and noise figure NF when the signal light is a single channel signal light.

The optical spectrum analyzer 13 analyzes the spectrum of signal light that is directly supplied from the light source 11 to the optical spectrum analyzer 13 via the signal line (optical fiber) L2 to prepare input light spectrum P1($\lambda$) data. Then, the optical spectrum analyzer 13 analyzes the spectrum of amplified signal light supplied via the signal line (optical fiber) L3 from the optical amplifier 12 to produce output light spectrum P2($\lambda$) data (Step S21).

The optical spectrum analyzer 13 supplies the calculated input light spectrum P1($\lambda$) data and output light spectrum P2($\lambda$) data to the data processing portion 14. The data processing portion 14 calculates a peak value of the input light spectrum P1($\lambda$) data as an input light level Pin and a peak value of the output light spectrum P2($\lambda$) data as an output light level Pout, respectively. Then, the data processing portion 14 calculates the signal light wavelength $\lambda_S$ based on the input light spectrum P1($\lambda$) data or the output light spectrum P2($\lambda$) data (Step S22).

Moreover, the data processing portion 14 performs a fitting process in terms of the output light spectrum P2($\lambda$) data to prepare ASE light spectrum P3($\lambda$) data, The data processing portion 14 also calculates the ASE light level P ASE based on the prepared ASE light spectrum P3($\lambda$) data (Step S23). Herein, the ASE light level P ASE has a value of P3($\lambda_S$) when the signal light wavelength of the ASE light spectrum P3($\lambda$) is $\lambda_S$.

Now, the description of the flowchart shown in FIG. 2 will be temporarily interrupted, and the processes for calculating the ASE light spectrum P3($\lambda$) and ASE light level P ASE shown in the above-described step S23 will be described in further detail with reference to FIG. 3 and FIGS. 4A and 4B.

Figure 3:
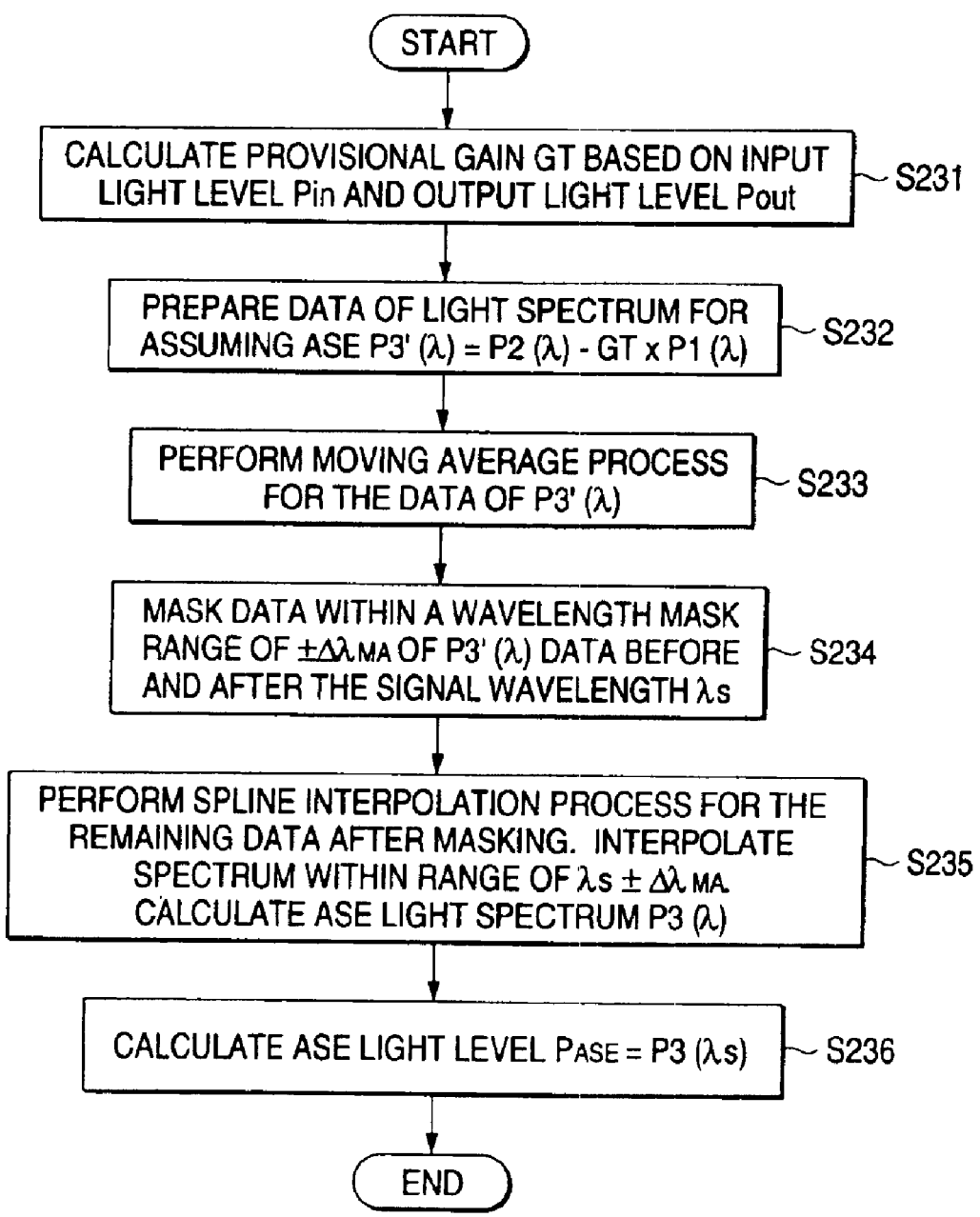
FIG. 3 is a flowchart for explaining processes for calculating the ASE light spectrum P3($\lambda$) and ASE light level P ASE in the noise figure-measuring device 10 according to an embodiment of the present invention.

FIG. 3 is a flowchart for explaining processes for calculating the ASE light spectrum P3($\lambda$) and ASE light level P ASE shown in step S23. FIG. 4A is a diagram mainly showing the provisional ASE light level P ASE0 and provisional gain GT. FIG. 4B is a diagram mainly showing the optical spectrum for assuming ASE P3'($\lambda$) and ASE light level P ASE.

Figure 4A:
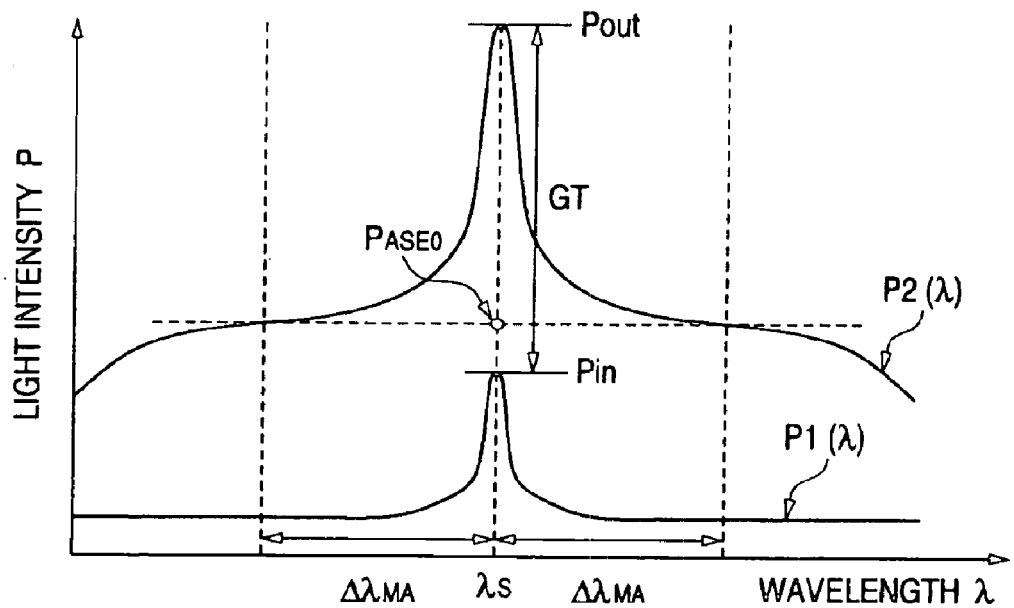
FIG. 4A is a diagram mainly showing the provisional ASE light level P ASE0 and provisional gain GT.

First, as shown in FIG. 4A, the data processing portion 14 assumes, in addition to the input light level Pin and output light level Pout that have been calculated in step S22 of FIG. 2, a straight line which connects two points on the output light spectrum P2($\lambda$) when $\lambda=\lambda_S\pm\Delta\lambda_{MA}$ and calculates the provisional gain GT based on a value of P ASE0 (provisional ASE light level) at $\lambda_S$ on the straight line (Step S231). Herein, the provisional gain GT is calculated using GT=(Pout−P ASE0)/Pin.

Then, the data processing portion 14 prepares optical spectrum for assuming ASE P3'($\lambda$) data based on the provisional gain GT (Step S232) and performs a moving average process for the calculated optical spectrum for assuming ASE P3'($\lambda$) data (Step S233).

Herein, the optical spectrum for assuming ASE P3'($\lambda$) data is calculated using P3'($\lambda$)=P2($\lambda$)−GT×P1($\lambda$) and is a value obtained by subtracting the amplified SSE light component of GT×P1($\lambda$) from the output light spectrum P2($\lambda$). Thus, the SSE light component is not included in the optical spectrum for assuming ASE P3'($\lambda$).

In addition, the moving average process in step S233 is a process for suppressing influences from noise when performing a spline interpolation process, which will be described below, however, it is also possible to omit this process in the present invention.

Then, with respect to the optical spectrum for assuming ASE P3'($\lambda$), the data processing portion 14 masks P3'($\lambda$) data within a wavelength mask range ($\lambda_S-\Delta\lambda_{MA}$ or above and $\lambda_S+\Delta\lambda_{MA}$ or below) covering a wavelength mask range of $\pm\Delta\lambda_{MA}$ around the center of the signal wavelength $\lambda_S$ (Step S234). That is, the optical spectrum for assuming ASE P3'($\lambda$) data within the wavelength range is removed or masked. Thus, a signal component as a noise component which is unnecessary when specifying the ASE light spectrum P3($\lambda$) is removed.

Figure 4B:
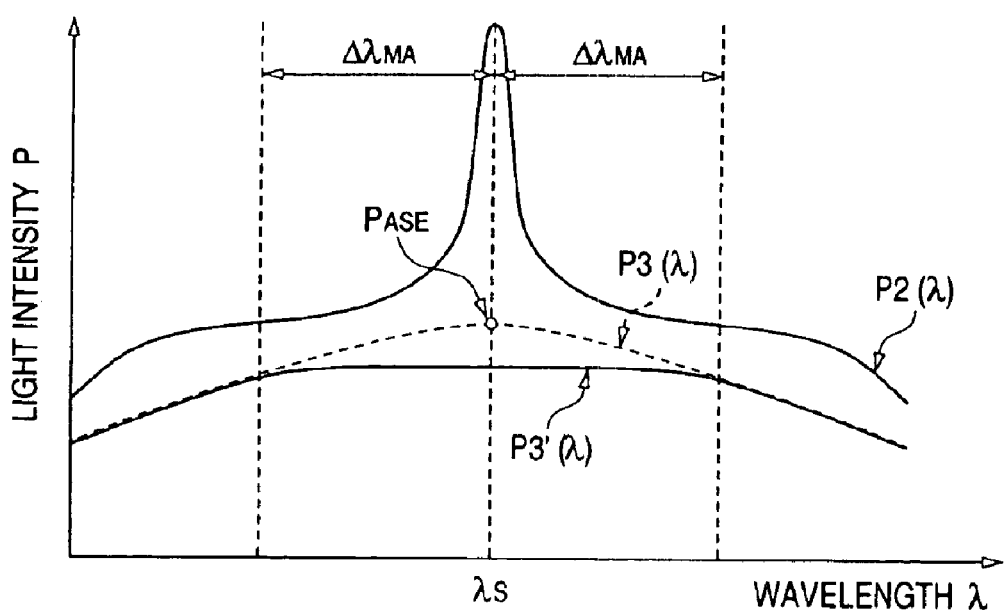
FIG. 4B is a diagram mainly showing the optical spectrum for assuming ASE P3'($\lambda$) and ASE light level P ASE.

Then, as shown in FIG. 4B, the data processing portion 14 performs a spline interpolation process by means of a spline curve for the optical spectrum for assuming ASE P3'($\lambda$) data within a wavelength range ($\lambda_S-\Delta\lambda_{MA}$ or below, or $\lambda_S+\Delta\lambda_{MA}$ or above) excluding the above-described wavelength mask range, interpolates a spectrum within the wavelength mask region, and prepares the ASE light spectrum P3($\lambda$) data (Step S23).

Herein, in the above-described spline interpolation process, by curve-fitting a spline curve which passes through all points to be used for the interpolation, ASE light spectrum P3($\lambda$) which suits an original spectrum curve including interpolated points can be obtained.

In addition, the points herein used for interpolation are not necessarily all points within the above-described wavelength range ($\lambda_S-\Delta\lambda_{MA}$ or below, or $\lambda_S+\Delta\lambda_{MA}$ or above) of the ASE light spectrum P3'($\lambda$) data and, for example, data for each point may be used.

The data processing portion 14 calculates an ASE light spectrum P3($\lambda$) data value at the signal light wavelength $\lambda_S$ as an ASE light level P ASE (Step S236) and changes over to a step S24 shown in FIG. 2.

Herein, the flowchart of FIG. 2 will be described again.

First, the data processing portion 14 calculates a gain G of the optical amplifier using G=(Pout-P ASE)/Pin based on the ASE light level P ASE, that has been calculated in the above described step S236, and also calculates a noise figure NF based on the gain G herein obtained (Step S24).

Herein, the noise figure NF is calculated in accordance with NF=P ASE/(G×h×v×Δv) or NF=P ASE/(G×h×v×Δv)+ 1/G. In the formulas, the symbol "h" denotes Planck's constant, Δv denotes a value obtained by frequency-converting wavelength resolution of the optical spectrumanalyzer 13, and furthermore, v denotes a value obtained by frequency-converting the signal light wavelength $\lambda_S$.

The description of the processes for measuring the gain G and noise figure NF of the optical amplifier 12 when the signal light that is output from the signal light source 11 is a single channel signal light is completed.

Moreover, processes for measuring the gain G and noise figure NF of the optical amplifier 12 when the signal light that is output from the signal light source 11 is multiplexed WDM light having multiple channels will be described with reference to FIG. 5 and FIG. 6.

Figure 5:
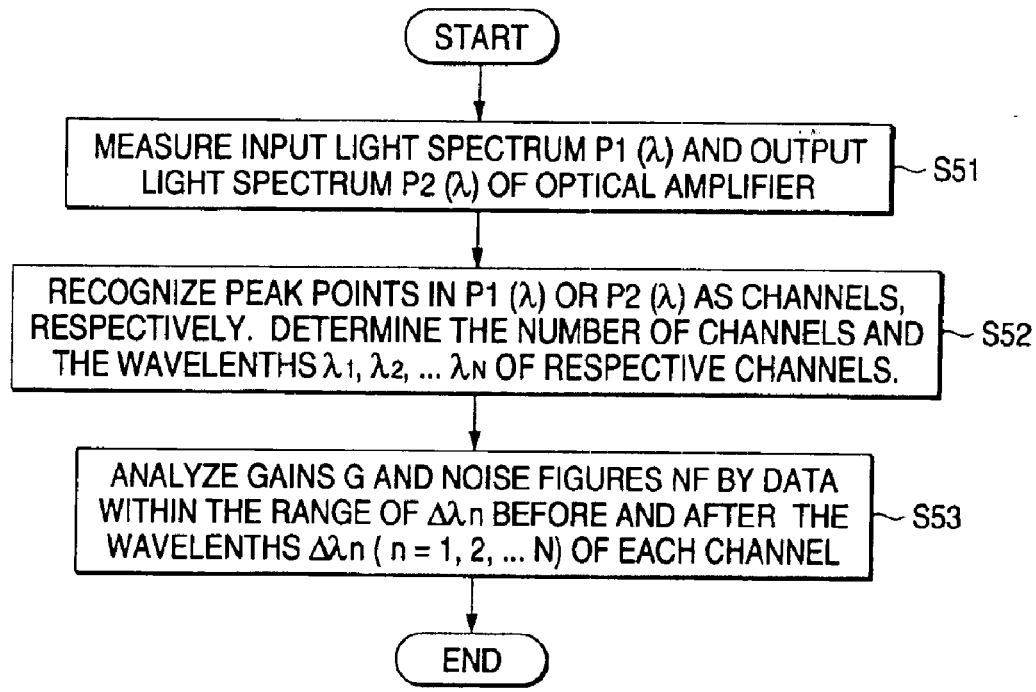
FIG. 5 is a flowchart for explaining multi-channel NF analyzing processes when the signal light is WDM light in the noise figure-measuring device 10 according to an embodiment of the present invention.
Figure 6:
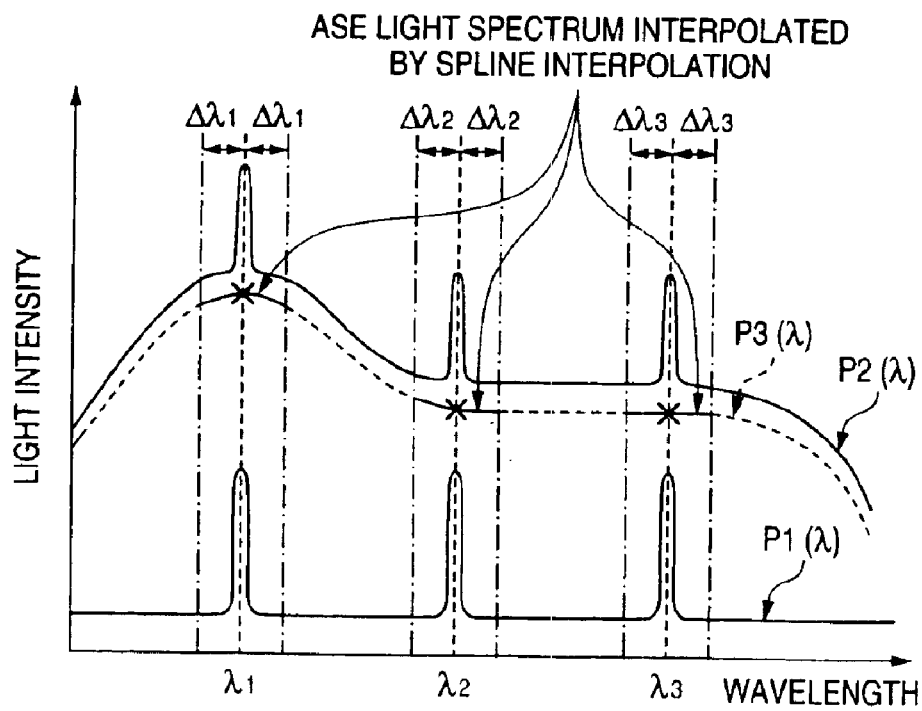
FIG. 6 is a diagram mainly showing the input light spectrum P1($\lambda$), output light spectrum P2($\lambda$), and ASE light spectrum P3($\lambda$) in terms of 3-channel signal light in the noise figure-measuring device 10 according to an embodiment of the present invention.
Figure 7:
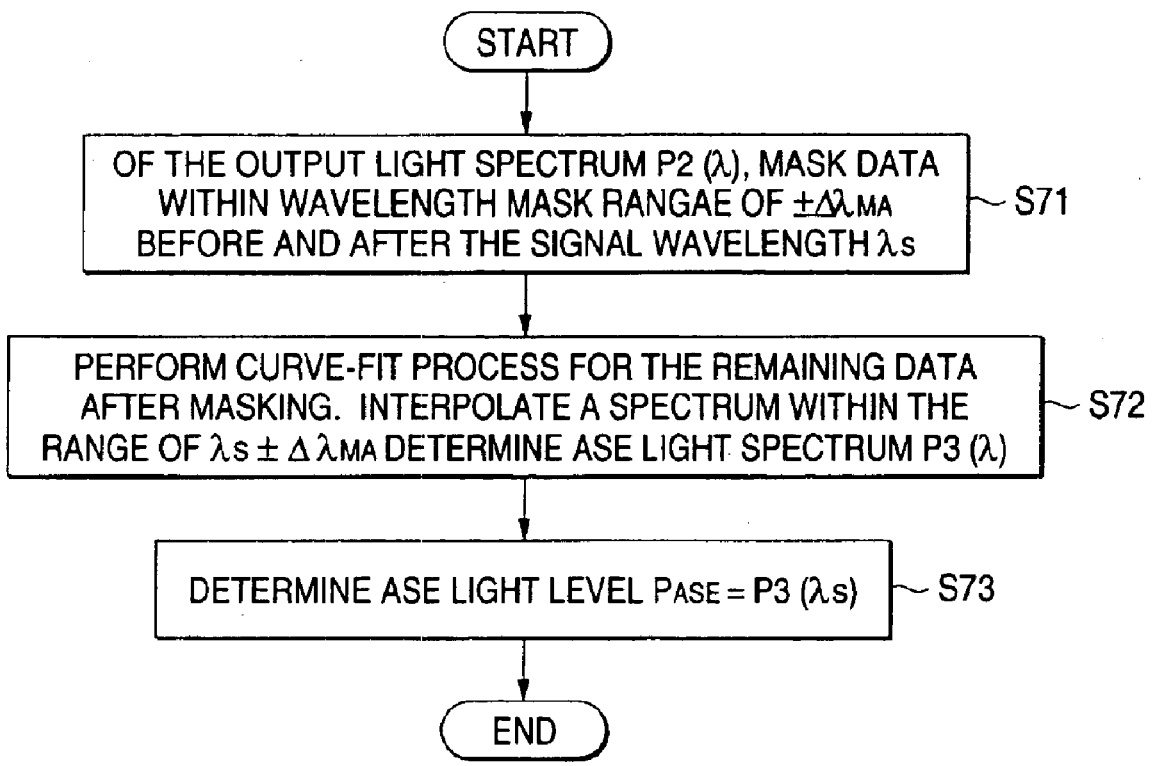
FIG. 7 is a flowchart for explaining ASE light level measurement in the conventional art.
Figure 8A:
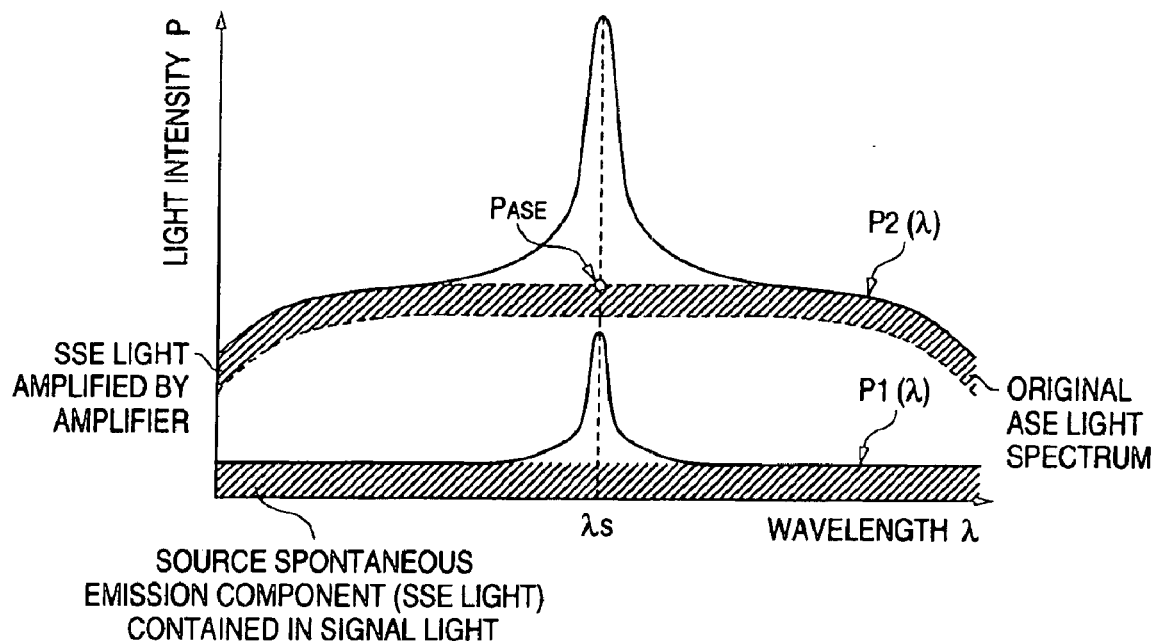
FIGS. 8A is a diagram showing a condition where SSE light is included in the input light and output light of the optical amplifier.
Figure 8B:
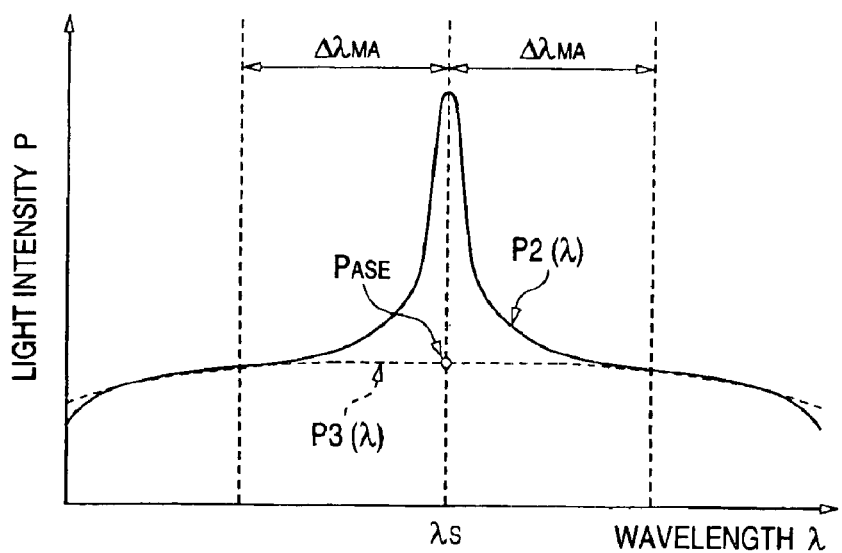
FIG. 8B is a diagram for explaining the prior method wherein the ASE light level P ASE is specified based on the output light spectrum P2($\lambda$) and ASE light spectrum P3($\lambda$).

FIG. 5 is a flowchart for explaining multi-channel NF analyzing processes when the signal light is WDM light, and FIG. 6 is a diagram mainly showing the incident light spectrum P1($\lambda$), output light spectrum P2($\lambda$), and ASE light spectrum P3($\lambda$) in terms of 3-channel signal light.

Signal light to be output from the signal light source 11 is 3-channel signal light. Such signal light is supplied to the optical amplifier 12 and the optical spectrum analyzer 13 via the signal line (optical fiber) L1 and the signal line (optical fiber) L2. Also, the signal light supplied to the optical amplifier 12 is then amplified based on an appointed gain ratio and output to the optical spectrum analyzer 13 via the signal line (optical fiber) L3.

In the optical spectrum analyzer 13, the spectrum of the signal light that has been directly inputted from the signal light source 11 is set as input light spectrum P1($\lambda$) and the spectrum of signal light that has been output from the optical amplifier 12 is set as output light spectrum P2($\lambda$), spectrum data of each thereof is prepared (Step S51), and the prepared spectrum data is supplied to the data processing portion 14.

The data processing portion 14 detects three peak values in the input light spectrum P1($\lambda$) data and output light spectrum P2($\lambda$) data that have been supplied from the optical spectrum analyzer 13, recognizes the detected three peak values as channels, and calculates the number of channels "3" and signal light wavelengths $\lambda 1$, $\lambda 2$, and $\lambda 3$ of the respective channels.

As shown in FIG. 6, the data processing portion 14 performs processes for measuring the gain G and noise figure NF of the aforementioned single channel signal light for the respective spectrum data of wavelength ranges $\pm\Delta\lambda 1$, $\pm\Delta\lambda 2$, and $\pm\Delta\lambda 3$ that are before and after the signal light wavelengths $\lambda 1$, $\lambda 2$, and $\lambda 3$ of the respective channels, and calculates gains G1, G2, and G3 and noise figures NF1, NF2, and NF3, respectively (Step S53).

As has been described in the foregoing, according to the noise figure-measuring device 10 of the present embodiment, the signal line (optical fiber) L2 is provided, whereby making it possible to directly input signal light that is output from the signal light source 11 into the optical spectrum analyzer 13, output light spectrum P2($\lambda$) data of output signal light that is output from the optical amplifier 12 and input light spectrum P1($\lambda$) data of the signal light that has been directly output from the signal light source 11 are prepared, the difference between the output light spectrum P2($\lambda$) data value and a value obtained by multiplying the input light spectrum P1($\lambda$) data by a provisional gain GT is determined, for the obtained spectrum data, a moving average process is performed and then, a spline interpolation process is also performed, whereby ASE light spectrum P3($\lambda$) data is prepared and an ASE light level P ASE is determined. In addition, the noise figure-measuring device 10 calculates the number of channels of WDM light and signal light wavelengths of the respective channels based on the input light spectrum P1($\lambda$) or output light spectrum P2($\lambda$) and performs analyzes, in a lump, for calculating noise figures NF and the like within appointed wavelength ranges around the centers of the calculated respective wavelengths.

Accordingly, the ASE light spectrum P3($\lambda$) data is prepared by subtracting a value obtained by multiplying the input light spectrum P1($\lambda$) by the provisional gain GT from the output light spectrum P2($\lambda$), therefore, it becomes possible to prepare ASE light spectrum P3($\lambda$) data in that influences from the SSE light component are suppressed, thus accurate measurement of the ASE light level P ASE and noise figures NF can be realized.

In addition, when preparing the ASE light spectrum P3($\lambda$) data, a function fitting is performed through the spline interpolation process using a spline curve, therefore, it becomes possible to perform the fitting more accurately compared to the case where a fitting process is performed using a high-degree function such as a normal distribution curve, a Lorenz curve or the like, thus accurate measurement of the ASE light level P ASE and noise figures NF can be realized.

Also, before performing the fitting process by the above-described spline interpolation, a moving average process is performed for the object data to be processed, therefore noise and the like that have been produced during measurement of the optical spectrum are removed, accurate measurement of the ASE light level P ASE and noise figures NF can be realized.

Also, the number of channels that signal light includes and the signal light wavelength $\lambda$ of each channel are calculated in advance based on the input light spectrum P1($\lambda$) data or output light spectrum P2($\lambda$) data and analysis for calculating noise figures NF performed in a lump within appointed wavelength ranges around the centers of calculated respective wavelengths, therefore performing measurement for each channel becomes unnecessary and convenience is improved.

According to the invention, when measuring the noise figure accompanying the optical amplifying section, measurement based on not only the optical spectrum information of signal light that has been amplified by the optical amplifying section but also the optical spectrum information of signal light from the light source becomes possible, thus realizing an improvement in measurement accuracy of the noise figure.

According to the invention, it becomes possible to remove noise components due to source spontaneous emission light from the optical spectrum information of signal light that has been amplified by the optical amplifying section, thus providing a noise figure-measuring device in which measurement accuracy of the noise figure accompanying the light amplifier is further improved.

According to the invention, a process for interpolating the optical spectrum information by means of a spline curve, whereby it becomes possible to perform an interpolation process more accurately compared to the case using a high-degree function such as a normal distribution curve, a Lorenz curve or the like, thus an accurate noise figure-measuring device can be realized.

According to the invention, with respect to appointed optical spectrum information, when performing a spline interpolation process using a spline curve for an appointed wavelength region of such optical spectrum information, the interpolation process is performed by means of data of an arbitrary number of points from one point to all points in the wavelength region, and therefore a noise figure-measuring device having high functionality, that can perform a preferable interpolation process independent of the number of points to be employed as data, can be provided.

According to the invention, a moving average process is performed for optical spectrum information before performing the interpolation process using a spline curve, and therefore it becomes possible to remove noise that has been inducted by the spectrum analyzing means, thus a further accurate noise figure-measuring device can be realized.

According to the invention, if the optical spectrum information has been prepared from a composite light of a plurality of signal lights, based on the optical spectrum of each signal light, without performing an analyzing process relating to measurement of the noise figure one by one, such processes can be performed in a lump, thus a noise figure-measuring device which is improved in operability and functionality can be realized.

What is claimed is:

1. A noise figure-measuring device comprising;
    an optical spectrum analyzing section for preparing optical spectrum information of signal light from a light source; and
    a noise figure calculating section for calculating, based on the optical spectrum information, a noise figure generated by an optical amplifier, the optical amplifier for amplifying the signal light from the light source at an appointed gain ratio, the appointed gain ratio determined by using a provisional ASE light level from the light source, the optical amplifier preparing an amplified light signal with the noise figure;
    wherein the optical spectrum analyzing section prepares the optical spectrum information of the signal light from the light source and optical spectrum information of the amplified signal light.

2. The noise figure-measuring device as set forth in claim 1, wherein the noise figure calculating section multiplies the optical spectrum information of the light signal from the light source by a coefficient to prepare multiplied optical spectrum information, the coefficient calculated by subtracting the provisional ASE light level from a peak value of the amplified light source and dividing a difference by a peak value of the signal light; and
    the noise figure calculating section subtracts the multiplied optical spectrum information from the optical spectrum information of the amplified signal light to prepare subtracted optical spectrum information.

3. The noise figure-measuring device as set forth in claim 2, wherein the noise figure calculating section removes or masks spectrum information of an appointed wavelength region in the subtracted optical spectrum information; and
    the noise figure calculating section performs a spline interpolation using a spline curve for the wavelength region.

4. The noise figure-measuring device as set forth in claim 3, wherein the interpolation is performed by selecting data of an predetermined number of points from all points contained in the wavelength region.

5. The noise figure-measuring device as set forth in claim 3, wherein the noise figure calculating section performs a noise removing process by a moving average process for the subtracted optical spectrum information.

6. The noise figure measuring device of claim 1 wherein the optical spectrum information has been prepared from a composite light of a plurality of signal lights; and
    the noise figure calculating section detects the number of composing signal lights and wavelengths, and calculates a noise figure generated by the optical amplifier for each of the signal light detected.

7. A noise figure-measuring method comprising:
    preparing optical spectrum information of appointed signal light;
    preparing optical spectrum information of amplified signal light using a provisional ASE light level from the appointed signal light; and
    calculating a noise figure contained in the amplified signal light based on the optical spectrum information of the appointed signal light and the amplified signal light.

8. The noise figure-measuring method as set forth in claim 7, wherein the noise figure calculating step multiplies the optical spectrum information of the light signal from the light source by a coefficient to prepare multiplied optical spectrum information, the coefficient calculated by subtracting the provisional ASE light level from a peak value of the amplified signal light and dividing a difference by a peak value of the appointed signal light; and
    the noise figure calculating step subtracts the multiplied optical spectrum information from the optical spectrum information of the amplified signal light to prepare a subtracted optical spectrum information.

9. The noise figure-measuring method as set forth in claim 8, wherein the noise figure calculating step removes or masks spectrum information of an appointed wavelength region in the subtracted optical spectrum information; and
    the noise figure calculating step performs a spline interpolation using a spline curve for the wavelength region.

10. The noise figure-measuring method as set forth in claim 9, wherein the interpolation is performed by selecting data of an predetermined number of points from all points contained in the wavelength region.

11. The noise fire-measuring method as set forth in claim 9, wherein the noise figure calculating step performs a noise removing process by a moving average process for the subtracted optical spectrum information.

12. The noise figure-measuring method of claim 7 wherein the optical spectrum information is prepared from a composite light of a plurality of signal lights; and
    the noise figure calculating step detects the number of composing signal lights and wavelengths, and calculates a noise figure generated by the optical amplifier for each of the signal light detected.

* * * * *